United States Patent [19]
Yamada et al.

[11] Patent Number: 4,477,170
[45] Date of Patent: Oct. 16, 1984

[54] ANNUNCIATOR FOR FLASH PHOTOGRAPHING SYSTEM

[75] Inventors: Masanori Yamada; Makoto Katsuma, both of Kanagawa, Japan

[73] Assignee: Canon Kabushiki Kaisha, Tokyo, Japan

[21] Appl. No.: 429,523

[22] Filed: Sep. 30, 1982

[30] Foreign Application Priority Data

Oct. 13, 1981 [JP] Japan .................... 56-163631

[51] Int. Cl.³ .............. G03B 15/03; G03B 9/14; G03B 7/08; G03B 17/18
[52] U.S. Cl. .................... 354/415; 354/456; 354/471; 354/480
[58] Field of Search ........... 354/32, 60 E, 60 L, 354/53, 127, 128, 234, 354, 415, 456, 471, 480

[56] References Cited

U.S. PATENT DOCUMENTS 3,922,693 11/1975 Matsui .................... 354/234 X
4,238,149 12/1980 Uchiyama et al. ............ 354/128
4,295,717 10/1981 Kitagawa .................. 354/128 X

FOREIGN PATENT DOCUMENTS 2838085 3/1979 Fed. Rep. of Germany ...... 354/234

Primary Examiner—Michael L. Gellner
Assistant Examiner—Douglas S. Lee
Attorney, Agent, or Firm—Toren, McGeady and Stanger

[57] ABSTRACT

A flash photography system including a computer type electronic flash device and a camera controlling the exposure value by using the light coming from an object to be photographed and reflected from the shutter curtain and/or film surface is disclosed. The leading and trailing curtains in the slit shutter of the system run down simultaneously when test firing occurs, and the flash device controls the amount of flash light in accordance with an equivalent reflected light from the shutter curtain surfaces to that from the film surface. When the aforesaid amount of light reflected has reached a prescribed level, an annunciator is energized to inform the operator that a correct exposure can be obtained.

8 Claims, 5 Drawing Figures

ANNUNCIATOR FOR FLASH PHOTOGRAPHING SYSTEM

BACKGROUND OF THE INVENTION

1. Field of the Invention

This invention relates to a flash photography system including a computer type electronic flash device and a camera for controlling the exposure value by using the light coming from an object to be photographed and reflected from the film and/or shutter curtains, and more particularly to a flash photography system which is able to ascertain whether or not a proper exposure can be obtained prior to exposure.

2. Description of the Prior Art

Prior art includes a flash photography system for controlling the operation of a computer type electronic flash unit by using the output of an exposure control sensor element of a camera receptive to the reflected light from the film surface. In the flash photography system having a TTL (Through-The-Lens) light metering type auto-flash unit, the method of informing the user whether or not the proper exposure was obtained was to energize a display element when the flash light from the flash device, as reflected from the film surface, reaches a predetermined value. Therefore, this information cannot be given until the film frame has actually been shot or exposed. Thus, it was heretofore impossible to check whether or not proper exposure was obtained without exposing the film.

An object of the present invention is to provide a flash photography system capable of checking whether or not proper exposure can be obtained without exposing the film.

Another object of the present invention is to provide a flash photography system with means making it possible to automatically effect a test firing.

These and other objects of the present invention will become apparent from the following description of an embodiment thereof.

SUMMARY OF THE INVENTION

These and other objects of the invention may be attained in a flash photography system which includes a light emitting means for producing flash light with which an object to be photographed has to be illuminated, a shutter having leading and trailing curtains, and trigger means connected to the light emitting means to trigger the light emitting means when test-firing of the system occurs The apparatus also includes shutter driving means for the shutter to run down when no slit is formed between the leading curtain and the trailing curtain when in test firing and a light sensitive means is positioned to receive flash light reflected from the trailing curtain in test firing and flash light reflected from a film in normal flash exposure The light sensitive means produces an electrical signal proportional to the incident light. The apparatus includes a control signal producing means connected to the light sensitive means to produce a control signal when the electrical signal reaches a predetermined value. The control means is connected to the control signal producing means to terminate the emission of flash light from the light emitting means in response to the control signal. The apparatus also includes an annunciator which is energized in response to the control signal.

DESCRIPTION OF THE PREFERRED EMBODIMENT

Figure 1:
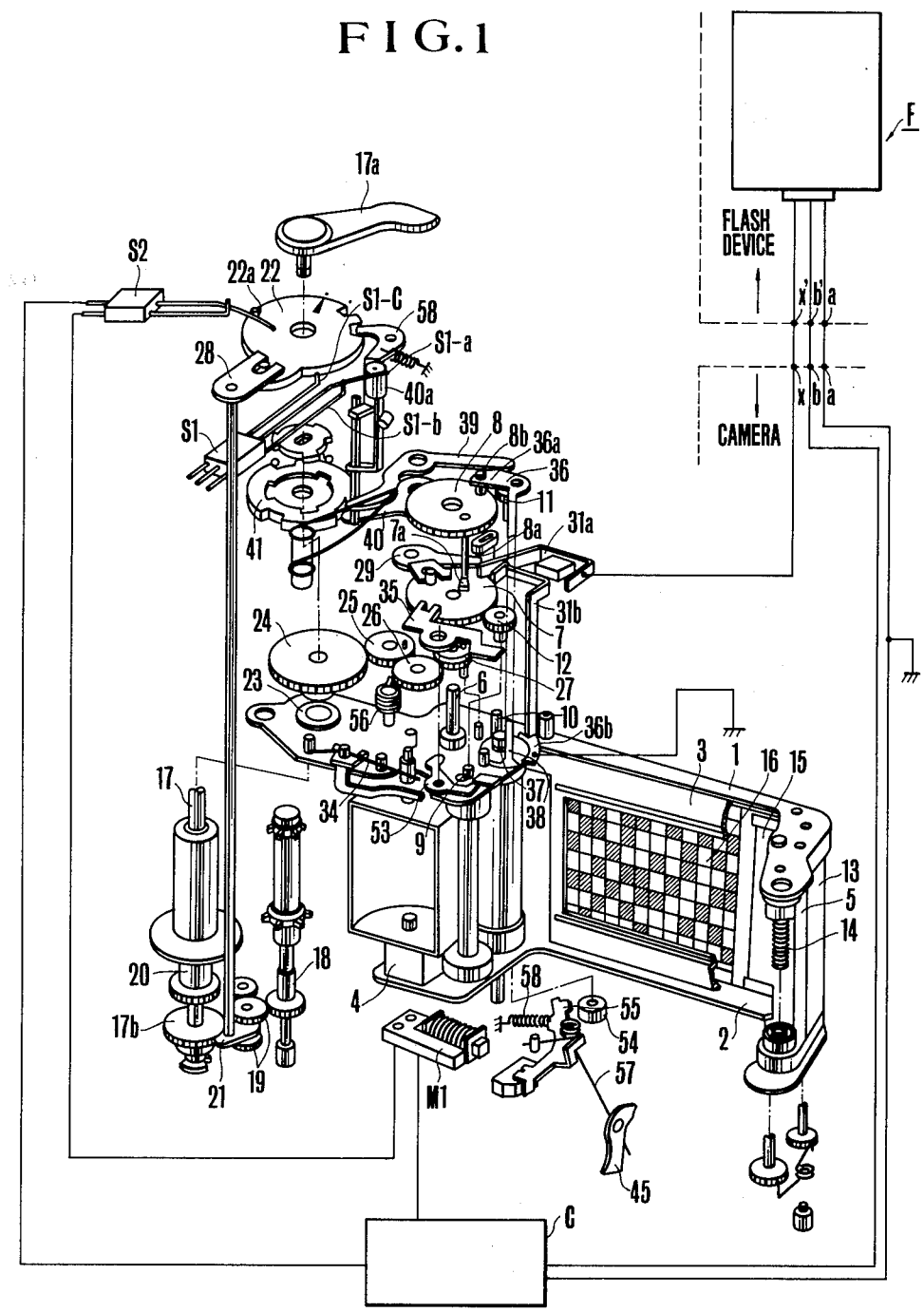
FIG. 1 is an exploded perspective view of the various mechanisms of a camera in an embodiment of a flash photography system according to the present invention.

In FIG. 1, reference numerals 1 and 2 identify upper and lower base plates of a shutter unit, these base plates 1 and 2 are supported by columns 4 and 5 formed of die cast aluminum or plastic The column 4 also serves as a battery box. A light shielding plate 3 is mounted in an exposure aperture position to define a beam of light coming from a lens system (not shown), and serves to reinforce the rigidity of the framework of the shutter unit. Mounted to the upper and lower base plates 1 and 2 is a shutter mechanism. In the single lens reflex camera, the upper and lower base plates 1 and 2 are cut out properly, as illustrated in the drawing. Explanation is given below to the shutter mechanism. A master shaft 6 on the upper base plate 1 is provided with a leading curtain master gear 7 and a trailing curtain master gear 8. The leading curtain master gear 7 meshes with a leading curtain pinion gear 12 of a leading curtain pinion shaft 9 rotatably supported on the upper and lower base plates 1 and 2, and the trailing curtain master gear 8 meshes with a trailing curtain pinion gear 11 of a trailing curtain pinion shaft 10 rotatably supported on the upper and lower base plates 1 and 2. Also, between the opposite sides of the upper and lower base plates 1 and 2 are a leading curtain spring drum 13 and a trailing curtain spring drum 14 in rotatable relation. Between these spring drums 13 and 14 and the pinion shafts 9 and 10 are a shutter leading curtain 15 and a shutter trailing curtain 16 respectively. The shutter trailing curtain 16 is provided with a random number pattern having a substantially equivalent reflection to the average reflection of various films. A winding-up shaft 17 has a winding lever 17a, this winding shaft 17 is drivingly connected to a sprocket shaft 18 by means known to those skilled in the art. A winding shaft gear 17b transmits motion through an intermediate gear group 19 to the sprocket shaft 18 and a spool shaft 20 to wind up the film. This intermediate gear group has a clutch mechanism cooperating with a clutch changeover pawl 21 to change over between motion transmission and non-transmission. On the top end of the sprocket shaft 18 is mounted a film footage gear (not shown) by which a footage disc count mechanism is operated. Therefore when in the motion non-transmitting position of the clutch changeover pawl 21, the winding operation does not cause film winding and footage disc counting to occur, while the other operations are carried out without hindrance. The winding shaft 17 is provided with a winding gear 24 rotatably supported on a bearing 23 so that when the winding lever 17a is cocked, motion of the winding gear 24 is transmitted through gears 25 and 26 to a shutter cocking gear 27 on the master shaft 6. The shutter cocking gear 27 has a projection which upon contact with a stopper, hinders its motion in a constant position Engaged with the projection is a pin 7a of the leading curtain master gear 7, and the pin 7a of the leading curtain master gear 7 latches a pin 8a of the trailing curtain master gear 8. Therefore, when the shutter cocking gear 27 rotates, the leading curtain master gear 7 and the trailing curtain master gear 8 rotate. A changeover switch S1 for motor drive operates in such a manner that when a movable contact S1-a is in contact with a fixed contact S1-c, a signal stopping motor drive winding motor is produced to render a shutter release possible, and when a movable contact S1-a is in contact with another fixed contact S1-b, an actuating signal is produced starting rotation of the winding motor.

A test firing changeover member 22 knows a responsive distance limit before making an exposure with the aforesaid TTL light meter. When the test firing changeover member 22 is switched to the test firing mode, a switch S2 is turned off, and a clutch responsive member 28 cuts off the clutch of the intermediate gear group 19 through the clutch changeover pawl 21. The switch S2 is connected in series to a trailing curtain holding magnet M1 for releasing a latch pawl 54 of a trailing curtain latch lever 55 so that when the switch is OFF, no current is supplied to the trailing curtain holding magnet M1. A changeover lock lever 58 locks the test firing changeover member 22 in an operative position. The changeover lock lever 58 engages a winding stop lever 40 and rotates clockwise as winding continues. That is, in the position where the winding stop lever 40 lies in a recess of a winding stop cam 41, or in the cocked position, one end of the changeover lock lever is out of a recess of the test firing changeover member 22 to thereby make it possible to actuate the test firing changeover member. Also, when the winding is not yet completed, the lever end enters the recess of the test firing changeover member to lock the changeover.

Figure 2:
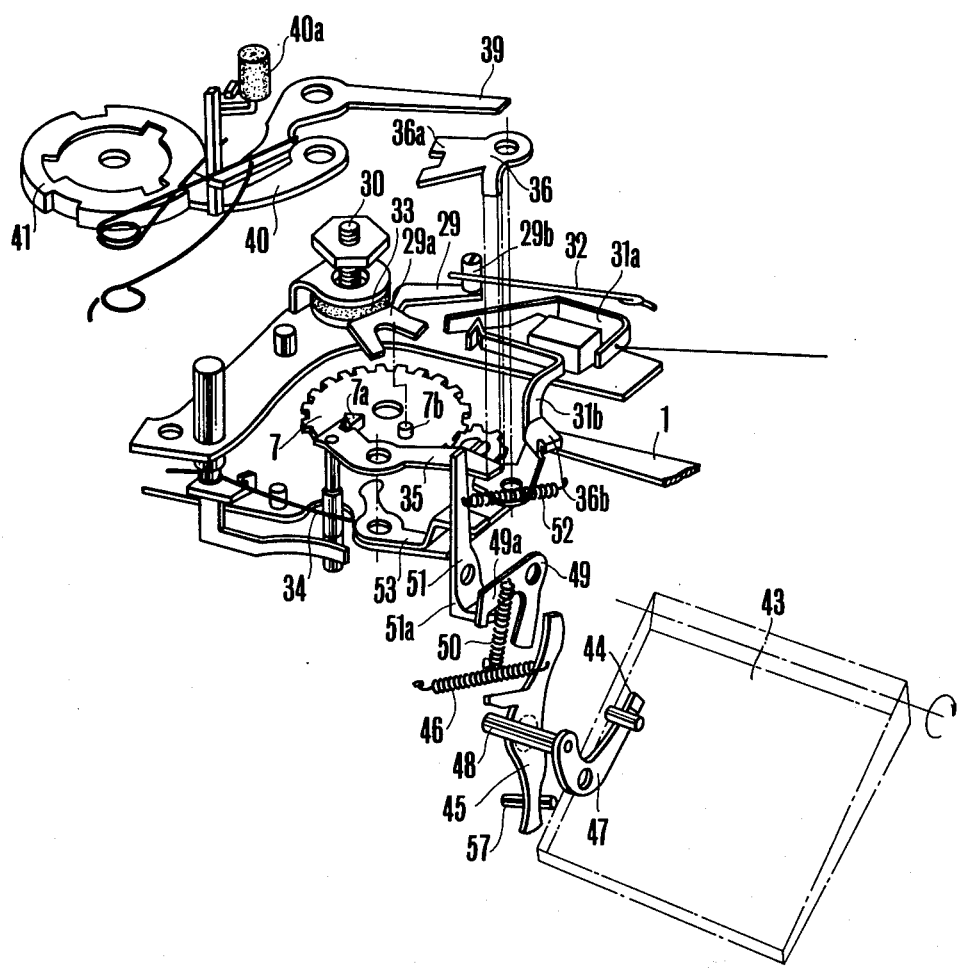
FIG. 2 is a perspective view of the synchro-contact, leading curtain brake and mirror mechanism in the camera of FIG. 1.

The perspective view of FIG. 2 illustrates the synchro-contact, leading curtain braking and mirror mechanisms in the camera of FIG. 1. In this drawing, a leading curtain brake lever 29 has a "Y" shaped arm 29a, one finger of which engages a pin 7b on the leading curtain master gear 7 just before the leading curtain 15 run down is terminated and then turns the leading curtain brake lever 29 about a pivot pin 30 so that the shutter leading curtain 15 is stopped by the braking action. When the leading curtain brake lever 29 turns, a switch contact 31a is brought into contact with another contact 31b by a pin 29b on the other end of the leading curtain brake lever 29. Thus, a 1st synchro-contact 31 is closed. A spring 32 is tensioned on the other end 29b of the leading curtain brake lever 29 always urging the leading curtain brake lever 29 to turn counter-clockwise, and a frictional member 33 made of leather or synthetic resin applies a pressure on the brake lever 29 with respect to the shaft 30. Therefore, similar to the leading curtain 15 braking force, the springing force of the aforesaid spring 32 and the frictional force are added. In charging the shutter, because the leading curtain master gear 7 rotates, the pin 7b advances while pushing the "Y" shaped portion 29a of the brake lever 29 and at the same time the force of the spring 32 is also added, thereby the leading curtain braking action is regained. A count switch 34 of an electronic shutter circuit, illustrated in FIG. 3, opens and closes in response to motion of a latch lever 35 for performing rotation of the master gear 7. In FIG. 1, reference numeral 36 identifies a trailing curtain brake lever; a shaft 37 has wound thereon a spring; and reference numeral 38 identifies a frictional member. This trailing curtain brake lever 36, similar to the leading curtain brake lever 29, performs a braking action on the shutter trailing curtain 16 when a pin 8b on the trailing curtain master gear 8 engages its one end 36a. At the time of completion of the running down movement of the trailing curtain 16, a winding release lever 39 and the winding stop lever 40 are turned in response to motion of one end 36a of the trailing curtain brake lever 36. Then when one end 40a of the winding stop lever 40 drops into a recess of a winding stop control cam 41 provided on the winding shaft 17, the switch S1 is changed over. Also the opposite end 36b of the trailing curtain brake lever 36 (see FIG. 2) cuts off the contact between the contacts 31b and 36b. Thus, a 2nd synchro-contact is turned off. With the help of a certain relation of this 2nd synchro-contact and the aforesaid 1st synchro-contact, when the leading curtain 15 and trailing curtain 16 start simultaneously, in other words, when the shutter runs down while the shutter slit is closed, both the synchro-contacts are simultaneously completely turned on at a point in time near the terminal end of movement of the shutter, since all the contacts 31a and 31b and all the brake levers 29 and 36 have been previously adjusted. A mirror receptor 43 supports a mirror; a pin 44 is formed as a unit with the mirror receptor 43. A lever 45 is urged by a spring 46 in a counter-clockwise direction, this lever engages a pin 48 planted on a lever 47 which engages the pin 44. A lever 49 is urged by a spring 50 to turn counter-clockwise. This lever 49 turns clockwise when the lever 45 turns counter-clockwise, and the lever 51 turns clockwise under the action of a spring 52 when the lever 49 is released from engagement. Such rotative movement in turn releases the latch lever 35 from engagement with the pin 7a. On the leading curtain master gear 7.53 is a lever for charging the lever 51.

Figure 3:
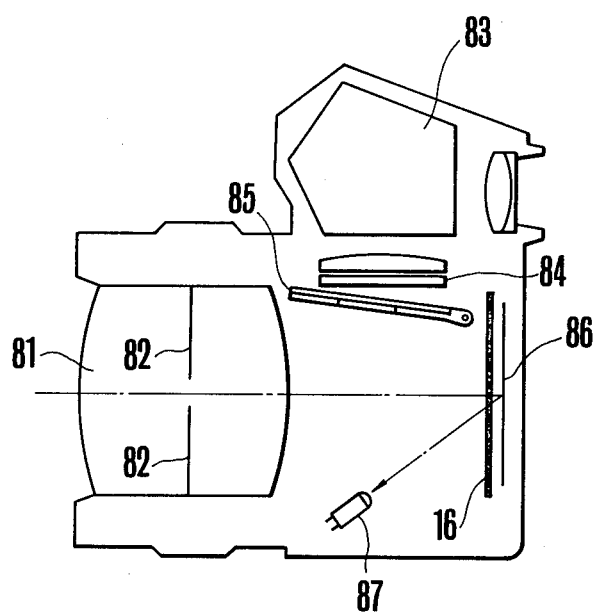
FIG. 3 is a schematic sectional view illustrating the relative position of the various parts when test-firing the camera according to the present invention.

FIG. 3 schematically illustrates the position of the various parts within the camera taken when the aforesaid embodiment is set in a test firing mode. In the drawing, reference numeral 81 identifies a photographic objective lens; reference numeral 82 identifies a diaphragm; reference numeral 83 identifies a penta prism; a member 84 constitutes a focusing plane; reference numeral 85 identifies a mirror; reference numeral 86 identifies a film; reference numeral 87 identifies a light-receiving element; reference numeral 16 identifies the trailing curtain of the shutter illustrated in FIG. 1.

Figure 4:
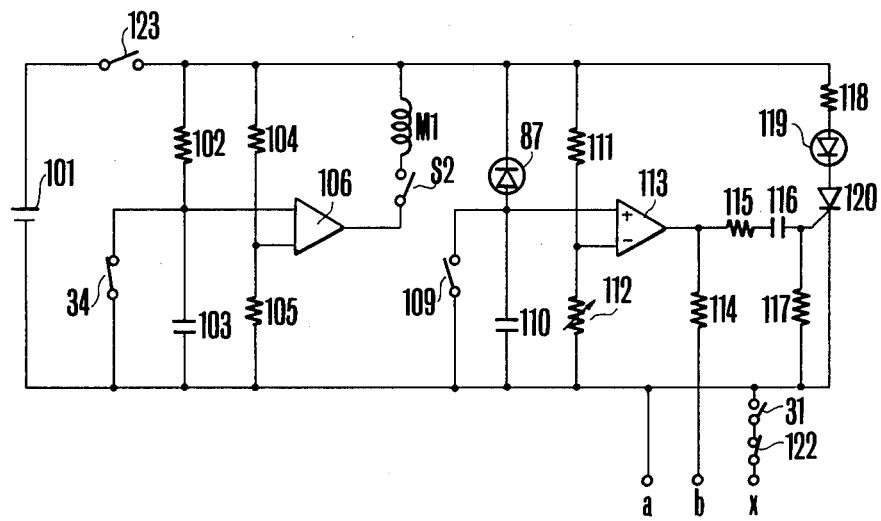
FIG. 4 is an electrical circuit diagram of the camera exposure control circuit of the flash photography system in the present invention.

FIG. 4 is an electrical circuit diagram illustrating an embodiment of the camera exposure control circuit of the aforesaid embodiment. In FIG. 4, reference numeral 101 identifies an electrical power source or battery; a switch 123 is closed when a releasing operation starts; a variable resistor 102 and a condenser 103 form a time constant circuit for shutter timing; a comparator 106 has one input connected to a junction point of resistors 104 and 105, and the other output is connected to a junction point of the variable resistor 102 and the condenser 103; the shutter closing control magnet M1 is connected through the switch S2 to the output of the aforesaid comparator. The resistors 102, 104 and 105, condenser 103, switch 34, comparator 106 and magnet M1 constitute a shutter time control circuit known to those skilled in the art. The switch S2 cooperates with the test firing changeover member illustrated in FIG. 1. The light receiving element 87, such as a photodiode, illustrated in FIG. 3, is in opposition to the film plane; reference numeral 110 identifies an integrator condenser; a switch 109 is opened when the mirror moves upwards; reference numeral 111 identifies a resistor; a variable resistor 112 has a value related to the film sensitivity; a comparator 113 has one input connected to a junction point of the photosensitive element 87 and the condenser 110 and the other input is connected to a junction point of the resistor 111 and the variable resistor 112. A resistor 114 has one end connected to the output of the comparator 113, and the other end is connected to an interconnection terminal on the camera housing; a resistor 115 and a condenser 116 are connected in series with each other, one end of the series-connected circuit is connected to the output of the comparator 113, the opposite end of which is connected to a gate of an SCR 120; reference numeral 117 identifies a gate resistor of the thyristor (SCR); reference numeral 119 identifies a light-emitting diode (LED); reference numeral 118 identifies a resistor. The series circuit of SCR 120, LED 119 and resistor 118 is connected in parallel to the battery through a switch 123. A 1st synchro-switch 31 is closed when the running down movement of the leading curtain 15 is completed; a switch 122 opens when the running down movement of the trailing curtain 16 is completed.

Figure 5:
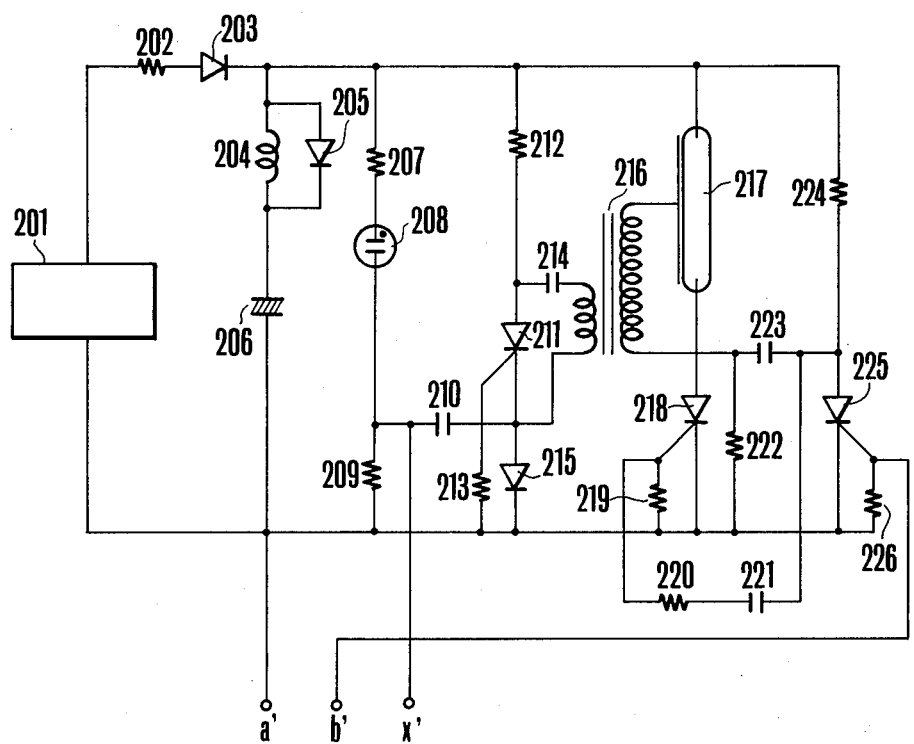
FIG. 5 is an electrical circuit diagram of the flash device used in the flash photography system of the present invention.

FIG. 5 is an electrical circuit diagram illustrating a practical example of the flash device of the aforesaid embodiment.

Reference numeral 201 identifies an electrical power source or battery; reference numeral 202 identifies a resistor reference numeral 203 identifies a reverse current preventing diode; a coil 204 and a diode 205 are connected in parallel to each other; a main condenser 206 is connected through the resistor 202, the diode 203 and the coil 204 to the battery 201; reference numerals 207, 208 and 209 respectively identify a resistor, a neon lamp for indicating when the main condenser is fully charged, and another resistor, these parts being connected in series to each other. A trigger condenser 210 has one pole connected to a junction point of the neon lamp 208 and the resistor 209 and also to an interconnection terminal X' on the housing of the flash device; an SCR 211 has its cathode connected to the trigger condenser 210; a resistor 213 is connected to the gate of the SCR 211; a diode 215 has its anode connected to the cathode of the SCR 211; reference numeral 214 identifies a trigger condenser; reference numeral 212 identifies a resistor through which the condenser 214 is charged; reference numeral 216 identifies a trigger transformer, the resistors 207, 209, 213 and 212, the condensers 210 and 214, neon lamp 208, SCR 211, diode 215 and trigger transformer 216 constitute a trigger circuit known to those skilled in the art; reference numeral 217 identifies a flash discharge tube; reference numeral 218 identifies a flash control SCR. Reference numeral 219 identifies a gate resistor of the SCR 218; a resistor 220 and a condenser 221 are connected in series to each other; reference numeral 223 identifies a commutation condenser; reference numerals 222 and 224 identify condensers; reference numeral 223 identifies a charging resistor; an auxiliary SCR 225 has its anode connected to one pole of the condenser 223 and its gate connected to an interconnection terminal on the flash device housing; reference numeral 226 identifies a gate resistor of the SCR 225. The flash discharge tube 217, the SCR 218, the auxiliary SCR 225, the commutation condenser 223, the resistors 219, 222, 224 and 226 and the condenser 221 constitute a flash firing control circuit known to those skilled in the art.

Explanation is now given to the operation of the embodiment of the invention shown in FIGS. 1 to 5. At first the operation in the test firing mode is as follows:

When the winding lever 17a is cocked, the winding gear 24 rotates and the rotation is transmitted through the gears 25 and 26 to the shutter cocking gear 27 on the master shaft 6. The projecting portion of this cocking gear 27 rotates the leading curtain master gear 7 through the pin of the leading curtain master gear 7 and also rotates the trailing curtain master gear 8 through the pin 7a-and-pin 8a connection. Since, therefore, the leading curtain pinion shaft 9 and the trailing curtain pinion shaft 10 also rotate, the shutter leading curtain 15 and the shutter trailing curtain 16 are wound up on the respective pinion shafts, while, the springs in the drums 14 and 13 are charged. This rotative movement of the leading curtain master gear 7 and trailing curtain master gear 8 also turns the brake levers 36 and 29 counter-clockwise respectively in engagement with the pins 7b and 8b. When the leading curtain brake lever 29 turns, its opposite end 29b (see FIG. 2) renders the 1st synchro-contact 31 open. Also, when the trailing curtain brake lever 36 turns counter-clockwise, one end 26a moves away from the winding stop release lever 39, permitting the winding stop lever 40 to turn clockwise under the action of the spring engaging the lever 39 and the winding stop lever 40. This winding stop lever 40 stops the winding operation when its projecting portion drops into the recess of the winding stop control cam 41 (formed as a unit with the winding gear 24) and the top end 40a brings the movable contact S1-a of the switch S1 into engagement with the fixed contact S1-c with the help of the spring, thereby the winding-up motor of the motor drive (not shown) is stopped from further rotation. Thus, actuation of a shutter release is rendered possible, and, at the same time, as the changeover lock lever 58 also turns clockwise to remove from the recess of the test firing changeover lever 22, changing over to the test firing mode is rendered possible. Also, the opposite end 36b of the trailing curtain brake lever 36 engages the contact 31b, thereby the 2nd synchro-contact is closed. Motion of the winding gear 24 is also transmitted through the gears 25 and 26 turning the charge lever 53 clockwise, thereby one end 51a of the lever 51 is engaged with a hooked portion 49a. Then, when it turns to a position where the hook 7a of the leading curtain master gear 7 is engaged by the latch lever 35, the engagement pawl 54 provided on the trailing curtain pinion shaft 10 is positioned for engagement with the latch lever 55. Latching of the leading curtain master gear 7 and the trailing curtain master gear 8 aligns the cutout portion of the winding gear 24 to the transmission gear 25, thereupon the transmission gear 25 and the winding gear 24 are taken out of mesh. Therefore, the transmission gear 25 along with another transmission gear 26 and the cocking gear 27 return to the winding start position under the action of the spring 56. Also, the motion of the winding shaft 17 is transmitted through the gear to the sprocket 18 and turns the film footage disc (not shown) one graduation for one film frame.

When the test firing changeover member 22 is moved to the test firing mode position, the switch S2 which is connected in series to the trailing curtain holding magnet M1 is turned off by the pin 22a on the test firing changeover member 22. That is, even when any signal is given to the trailing curtain holding magnet M1 by the exposure control circuit C during a series of sequence controls of the camera, turning off of the switch S2 assures that the magnet M1 is always left unenergized. But, since the spring 57 (FIG. 1) connected to the trailing curtain latch lever 55 when in the cocked position is engaged with the lever 45, the latch lever 55 engages the engagement pawl 54. Also, since the clutch of the intermediate gear group 19 is cut off by the clutch control member 28 through the clutch changeover pawl 21, motion of the winding shaft gear 17 is no longer transmitted to the sprocket 18 and the spool shaft 20. When change over to this test firing mode position occurs, a test firing mode display means (not shown) is actuated. It is needless to say that the provision of such means is easily accomplished.

With the system in the aforesaid test firing mode position, when a release is actuated, the power switch 123 illustrated in FIG. 4 is closed, and a diaphragm mechanism (not shown) adjusts the size of the aperture 82 (FIG. 3) to the preset proper value. Also, the lever 45 is released from the locking connection with a hook (not shown), thereby the lever 45 is turned counter-clockwise by the spring 46 (FIG. 2). Then, the lever 47 is acted on through the pin 48 to turn counter-clockwise while turning the mirror support 43 clockwise or upwards. Such counter-clockwise movement of the lever 45 also discharges the spring 57 which has, so far, brought the trailing curtain latch lever 55 into engagement with the pawl 54. In the normal exposure mode, at this time, the trailing curtain holding magnet M1 is in energization by the command of the exposure control circuit C, so that the latch lever 55 is held by the trailing curtain holding magnet M1 to latch the engagement pawl 54. But in the test firing mode, because of the trailing curtain holding magnet M1 being left unenergized by the action of the switch S2, the latching connection of the engagement pawl 54 is released by the spring 58. Since, however, the pin 8a of the trailing master gear 8 is barred by the pin 7a of the leading curtain master gear 7 until the leading curtain starts to move, so long as the leading curtain 15 does not start to move, the trailing curtain 16 does not move. Also just before or when the mirror-up operation ends, the lever 49 is turned in the clockwise direction by the lever 45, thereby the hooked portion 49a and the lever 51 are disengaged from each other. Then, the lever 51 turns in the clockwise direction under the bias force of the spring 52, turning the leading curtain latch lever 35 counter-clockwise releasing the hooked portion 7a of the leading curtain master gear 7 from the latching connection, thus turning the leading curtain master gear 7. At the same time as the leading curtain master gear 7 rotates, the trailing curtain master gear 8 also rotates. Therefore, as the pinion gear 12 and pinion shaft 9 rotate, the shutter leading curtain 15 runs down. Similarly as the pinion gear 11 and pinion shaft 10 rotate, the trailing curtain 16 also runs down. That is, the shutter runs down while the slit is kept closed. Just before the leading curtain 15 reaches the terminal end of movement, one end 29a of the leading curtain brake lever 29 engages the pin 7b on the leading curtan master gear 7 and the leading curtain brake lever 29 is turned about the shaft 30 braking the leading curtain of the shutter, while one end 29b engages the contact 31a with the contact 31b, thus turning on the 1st synchro-contact. Also, when the trailing curtain 16 nears the terminal end of movement, the pin 8b on the trailing curtain master gear 8 engages one end 36a of the trailing curtain brake lever 36, and the trailing curtain brake lever 36 turns braking the trailing curtain 16 of the shutter, while another end 36b of the trailing curtain brake lever 36 is cut off from the contact 31b, thus turning off the 2nd synchro-contact. In short, when the shutter curtains 15, 16 run down, the 1st synchro-contact 31 is closed and is followed by opening of the 2nd synchro-contact 122. It is to be noted that operation of the 1st and 2nd synchro-contacts 31, 122 respectively in the aforesaid manner is easily accomplished by adjusting the parts 31a, 31b, 29 and 36. And, just after the closure of the synchro-contact 31, both the synchro-contacts 31 and 122 are simultaneously closed. This closure is signalled through the terminal X on the camera housing and the terminal X' on the flash device housing to drive the trigger circuit, of known construction, including the resistors 207, 209, 213 and 212, condensers 210 and 214, neon lamp 208, diode 315, SCR 211, and trigger transformer 214. As the flash discharge tube is ionized, the cathode voltage of the flash discharge tube 217 changes which is supplied through the commutation condenser 223, the condenser 221 and the resistor 220 to the gate electrode of the main SCR 218, thereby the SCR 218 is conductive. As a result, the charge stored on the main condenser 206 is discharged through the inductance element 204, the flash tube 217 and the main SCR 218. Thus flash light is emitted. An object to be photographed is illuminated by the aforesaid flash light, and the reflected light from the object is received by the photo-diode 87 through the diaphragm aperture 82 of the same size as that which will be actually used when an exposure occurs. The condenser 110 integrates the photocurrent of the photo-diode 87. When the output voltage of the condenser 110 exceeds the negative input of the comparator 113, the output voltage of the comparator 113 rises so that the SCR 120 is rendered conductive through the resistor 115 and the condenser 116 to light up the display LED 119, and at the same time is given to the gate electrode of the auxiliary SCR 225 of FIG. 5 through the camera side terminal b and the flash device side terminal b' so that the flash light control circuit, of known construction, formed with the main SCR 218, the auxiliary SCR 225, the commutation condenser 223, the condenser 221, and the resistors 219, 220, 221 and 224 stops the flash light emission.

Operation in the normal flash exposure mode is as follows: When the test firing changeover member 22 is set to the normal exposure mode, the switch S2 is closed. Then when a release is actuated, the switch 123 of FIG. 4 is closed to supply current to the exposure control circuit. By this current supply, the magnet M1 is rendered operative to inhibit the trailing curtain from running down. From the release actuation to the mirror-up and therefrom to the start of running down of the leading curtain, the operation proceeds in a similar manner to that described in the test firing mode. Responsive to the mirror-up, the switch 34 opens so that the time constant circuit of the aforesaid shutter time control circuit operates. When the running down of the leading curtain is completed, the 1st synchro-contact 31 is closed to fire the flash tube, as has been described above. The reflected light from the object with flash illumination is received through the diaphragm aperture 82 and the film surface by the photo-diode 87. When the proper exposure is obtained, the LED 119 is driven as in the test firing mode, informing the operator that the proper exposure has been obtained.

In the present invention, recognition of whether or not a proper exposure is obtained prior to film exposure, which was impossible by the conventional flash photography system based on the use of reflected light from the film surface, is possible without exposing the film, thereby reliability of flash exposure by this system is greatly improved. Furthermore, changeover between this and the normal exposure mode for flash photography is easily performed. Therefore, a great advantage can be expected from management of the camera.

What we claim:
1. A flash photographing system comprising:
   (a) light emitting means for producing flash light with which an object to be photographed has to be illuminated;
   (b) a shutter having leading and trailing curtains;
   (c) trigger means connected to said light emitting means to trigger the light emitting means when a test-firing of the sytem is performed;
   (d) shutter driving means for the shutter to run in a condition that no slit is formed between the leading curtain and the trailing curtain when in said test firing;
   (e) light sensitive means positioned to receive said flash light reflected from said driven shutter in the case of said test firing and to receive said flash light reflected from a film in the case of the normal flash exposure, said light sensitive means producing an electrical signal proportional to the incident light;
   (f) control signal producing means connected to the light sensitive means to produce a control signal when the electrical signal reaches a predetermined value;
   (g) control means connected to the control signal producing means to terminate the emission of said flash light from the light emitting means in response to the control signal; and
   (h) an annunciator to be energized in response to the control signal.

2. A flash photographing system according to claim 1, wherein said annunciator includes a light emitting diode.

3. A flash photographing system according to claim 1, wherein said control signal producing means includes an integrating capacitor connected to the light sensitive means for integrating the electrical signal from the light sensitive means.

4. A flash photographing system according to claim 1, further comprising shutter releasing means.

5. A flash photographing system according to claim 4, wherein said trigger means connected to said light emitting means for triggering the light emitting means in response to an operation of said shutter releasing means.

6. A flash photographing system comprising:
   (a) light emitting means for producing flash light with which an object to be photographed has to be illuminated;
   (b) a shutter having leading and trailing curtains;
   (c) trigger means connected to said light emitting means to trigger the light emitting means when a test-firing of the system is performed;
   (d) shutter driving means for the shutter to run down in a condition that no slit is formed between the leading curtain and the trailing curtain when in said test firing;
   (e) light sensitive means positioned to receive said flash light reflected from said driven shutter when in said test firing, the light sensitive means producing an electrical signal proportional to the incident light;
   (f) control signal producing means connected to the light sensitive means to produce a control signal when the electrical signal reaches a predetermined value; and
   (g) an annunciator to be energized in response to the control signal.

7. A flash photographing system according to claim 6, wherein said shutter has substantially equivalent reflection to the reflection of the various films.

8. A flash photographing system according to claim 6, wherein said shutter trailing curtain has substantially equivalent reflection to the average reflection of the various films.

* * * * *